(12) United States Patent
Noe et al.

(10) Patent No.: US 11,010,487 B2
(45) Date of Patent: *May 18, 2021

(54) MULTI-TENANT AUTHORIZATION FRAMEWORK IN A DATA MANAGEMENT AND STORAGE CLUSTER

(71) Applicant: Rubrik, Inc., Palo Alto, CA (US)

(72) Inventors: Matthew Edward Noe, San Francisco, CA (US); Seungyeop Han, Sunnyvale, CA (US); Arohi Kumar, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/453,274

(22) Filed: Jun. 26, 2019

(65) Prior Publication Data

US 2019/0384929 A1 Dec. 19, 2019

Related U.S. Application Data

(63) Continuation of application No. 16/392,908, filed on Apr. 24, 2019, now Pat. No. 10,803,193, which is a continuation of application No. 16/008,989, filed on Jun. 14, 2018, now Pat. No. 10,380,369.

(51) Int. Cl.
*G06F 21/62* (2013.01)
*H04L 29/06* (2006.01)

(52) U.S. Cl.
CPC ........ *G06F 21/6218* (2013.01); *H04L 63/104* (2013.01)

(58) Field of Classification Search
CPC ..................... G06F 21/6218; H04L 63/104

USPC .............................................................. 726/4
See application file for complete search history.

(56) References Cited

U.S. PATENT DOCUMENTS

| | | | |
|---|---|---|---|
| 8,983,961 B2 * | 3/2015 | Chan | G06F 9/455 707/737 |
| 8,996,887 B2 | 3/2015 | Kadatch et al. | |
| 9,524,389 B1 * | 12/2016 | Roth | G06F 21/554 |
| 10,380,369 B1 | 8/2019 | Noe et al. | |

(Continued)

OTHER PUBLICATIONS

"U.S. Appl. No. 16/008,989, Non Final Office Action dated Nov. 2, 2018", 8 pgs.

(Continued)

*Primary Examiner* — Jacob Lipman

(74) *Attorney, Agent, or Firm* — Schwegman Lundberg & Woessner, P.A.

(57) ABSTRACT

A data management and storage (DMS) cluster of peer DMS nodes manages resources of a multi-tenant environment. The DMS cluster provides an authorization framework that provides user access which is scoped to the resources within a tenant organization and the privileges of the user within the organization. To authorize an action on a resource by a user, the DMS cluster determines determine user authorizations associated with the user defining privileges of the user on the resources of the multi-tenant environment, and organization authorizations associated defining resources of the multi-tenant environment that belong to the organization. The DMS cluster authorizes the action when the user authorizations and organizations authorized indicate that the action on the resource is authorized.

19 Claims, 15 Drawing Sheets

(56) References Cited

U.S. PATENT DOCUMENTS

2012/0096521 A1   4/2012   Peddada
2012/0102539 A1   4/2012   Robb et al.
2014/0013237 A1   1/2014   Roy-faderman et al.
2019/0384928 A1   12/2019  Noe et al.

OTHER PUBLICATIONS

"U.S. Appl. No. 16/008,989, Response filed Feb. 4, 2019 to Non Final Office Action dated Nov. 2, 2018", 13 pgs.
"U.S. Appl. No. 16/008,989, Notice of Allowance dated Apr. 9, 2019", 8 pgs.
"U.S. Appl. No. 16/392,908, Non Final Office Action dated Mar. 9, 2020", 7 pages.
"U.S. Appl. No. 16/392,908, Response filed Mar. 18, 2020 to Non Final Office Action dated Mar. 9, 2020", 10 pages.
U.S. Appl. No. 16/392,908, filed Apr. 24, 2019, Multi-Tenant Authorization Framework in a Data Management and Storage Cluster.

\* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| ... | ... | ... |

FIG. 3A

Job Queue 224

| job_id | start_time | job_type | job_info |
|--------|------------|----------------|----------------|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | ... |
| ... | | |

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

FIG. 3C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ... m001.im4-5 |
| m001.ss6 | 20171002.0900 | ... |
| ... | | |
| m001.ss12 | 20171003.2100 | m001.im1, ... m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4A

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | ... | ... |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ... m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | |
| ... | ... | ... |
| m001.ss12 | 20171003.2100 | m001.im5, ... m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | ... |
| m001.im11-12 | |
| m001.im5 | |
| m001.im5-1 | |

FIG. 4D

Organization Table 232

| organization_id | organization_name | parent_id |
|---|---|---|
| GlobalOrganization | Global Organization | Null |
| Organization1 | Organization 1 | GlobalOrganization |
| Organization2 | Organization 2 | GlobalOrganization |
| Organization3 | Organization 3 | Organization1 |
| ... | | |

FIG. 6

Authorization Table 236

| principal_id | organization_id | Role | privilege_group | Resource |
|---|---|---|---|---|
| Organization1 | Organization1 | Organization | ManageResource | Vcenter1 |
| Organization1 | Organization1 | Organization | ManageResource | Group1 |
| User1 | Organization1 | OrgAdmin | Basic | GlobalResource |
| User2 | GlobalOrganization | EndUser | Restore | VM1 |
| ... | | | | |

FIG. 7

MULTI-TENANT AUTHORIZATION FRAMEWORK IN A DATA MANAGEMENT AND STORAGE CLUSTER

CLAIM OF PRIORITY

This application is a continuation of and claims the benefit of priority of U.S. application Ser. No. 16/392,908, filed Apr. 24, 2019, which is a continuation of and claims the benefit of priority of U.S. application Ser. No. 16/008,989, filed Jun. 14, 2018, each of which is hereby incorporated by reference in its entirety.

TECHNICAL FIELD

The present invention generally relates to managing and storing data for multiple tenants.

BACKGROUND

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure, GCP (Google Cloud Platform), Nutanix AHV, Linux KVM (Kernel-based Virtual Machine), and Xen. While users may desire to have their applications and data be machine-agnostic, it typically is not easy to port applications and data between different platforms.

In addition, there often are economies of scale to operating larger compute infrastructures. However, the capacity of the infrastructure may be too large to be consumed by just one organization. Thus, it may be advantageous for multiple organizations, each with many users, to share a compute infrastructure. In such a situation, it is important that the different tenants are isolated from each other. Even though they are sharing a common compute infrastructure, users from one tenant typically do not have rights to access the resources of another tenant. Users that do not belong to any of the organizations may also require access to certain resources, for example to maintain the compute infrastructure.

Thus, there is a need for better approaches to managing and storing data, particularly across different virtual machine platforms and for multi-tenant situations.

SUMMARY

A data management and storage (DMS) cluster of peer DMS nodes manages resources of a multi-tenant environment. The DMS cluster provides an authorization framework that provides user access which is scoped to the resources within a tenant organization and the privileges of the user within the organization. To authorize an action on a resource by a user, the DMS cluster determines user authorizations associated with the user, where the user authorizations define privileges of the user on the resources of the multi-tenant environment. The DMS cluster also determines organization authorizations associated with the user's organization, where the organization authorizations define resources of the multi-tenant environment that belong to the organization. The authorizations define for the principal (i.e., the user or organization) a privilege group of the privileges and allowed actions on a particular resource. The authorizations framework may include concepts such as groups and inheritance. For example, if a user belong to a group, then the user will automatically have all the privileges that the group has. As another example, if an organization is the child of a parent organization, then the child organization will automatically inherit all the privileges of the parent organization. The DMS cluster authorizes the action by the user when the user authorizations and the organization authorizations indicate that the action by the user on the resource is authorized.

In some embodiments, a method includes determining the user authorizations associated with the user; determining an organization associated with the user and determining organization authorizations associated with the organization; determining whether the user authorizations and the organization authorizations indicate that the action by the user on the resource is authorized; and responsive to determining that the action by the user on the resource is authorized, executing the action on the resource.

Some embodiments include a DMS cluster which includes peer DMS nodes, and a distributed data store implemented across the peer DMS nodes. Each of the peer DMS nodes are configured to: determine user authorizations associated with a user; determine an organization associated with the user and determine organization authorizations associated with the organization; determine whether the user authorizations and the organization authorizations indicate that the action on the resource is authorized; and responsive to determining that the action on the resource is authorized, execute the action on the resource.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIGS. 1-2, according to one embodiment.

FIGS. 4A-4D are DMS tables that illustrate updating of snapshot images, according to one embodiment.

FIG. 6 is an organization table defining organizations of the multi-tenant DMS cluster, according to one embodiment.

FIG. 7 is an authorization table defining authorizations to perform actions on resources in an organization, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

In one implementation, a data management and storage (DMS) cluster of peer DMS nodes provides a multi-tenant compute environment and also provides an authorization framework for the multi-tenant environment. Different tenants are associated with different organizations, and each organization is associated with a set of resources of the multi-tenant environment. An authorization table stores authorizations. The authorizations define privilege groups (the privileges or allowed actions) on various resources (and any of its children) for various principals (user, organization, and groups and any children). To provide access or perform some other action on a resource, the authorizations of the user and the authorizations of the organization are checked against the authorization table to ensure that both the user and the organization are authorized for the specified action on the resource.

The authorization framework provides secure access to resources of the organization for authorized users within the organization. For example, the authorization framework allows users of different organizations to view the same user interface, but scoped to the resources within the tenant organization and the privileges of the user within the organization. Here, the action that is being authorized is access to view a resource. Other types of actions may include generating a snapshot of a virtual machine resources, or management operations on resources. As such, resources of different organizations may share a DM cluster while having their data secured from each other.

A "resource" refers to objects of a DMS cluster and may include protectable resources, users and groups, service level agreements (SLA), replication targets, or archive locations. An "organization" refers to a logical grouping of resources. Different tenants of a multi-tenant DMS cluster may each be associated with a different organization. A "principal" refers to an object that can be given an authorization on a resource and may include organizations, groups of users, or users. A "privilege" refers to the permission to perform an action. A "role" refers to a set of privilege groupings. An "authorization" specifies a role for a principal on a specific resource within an organization.

Figure 1:
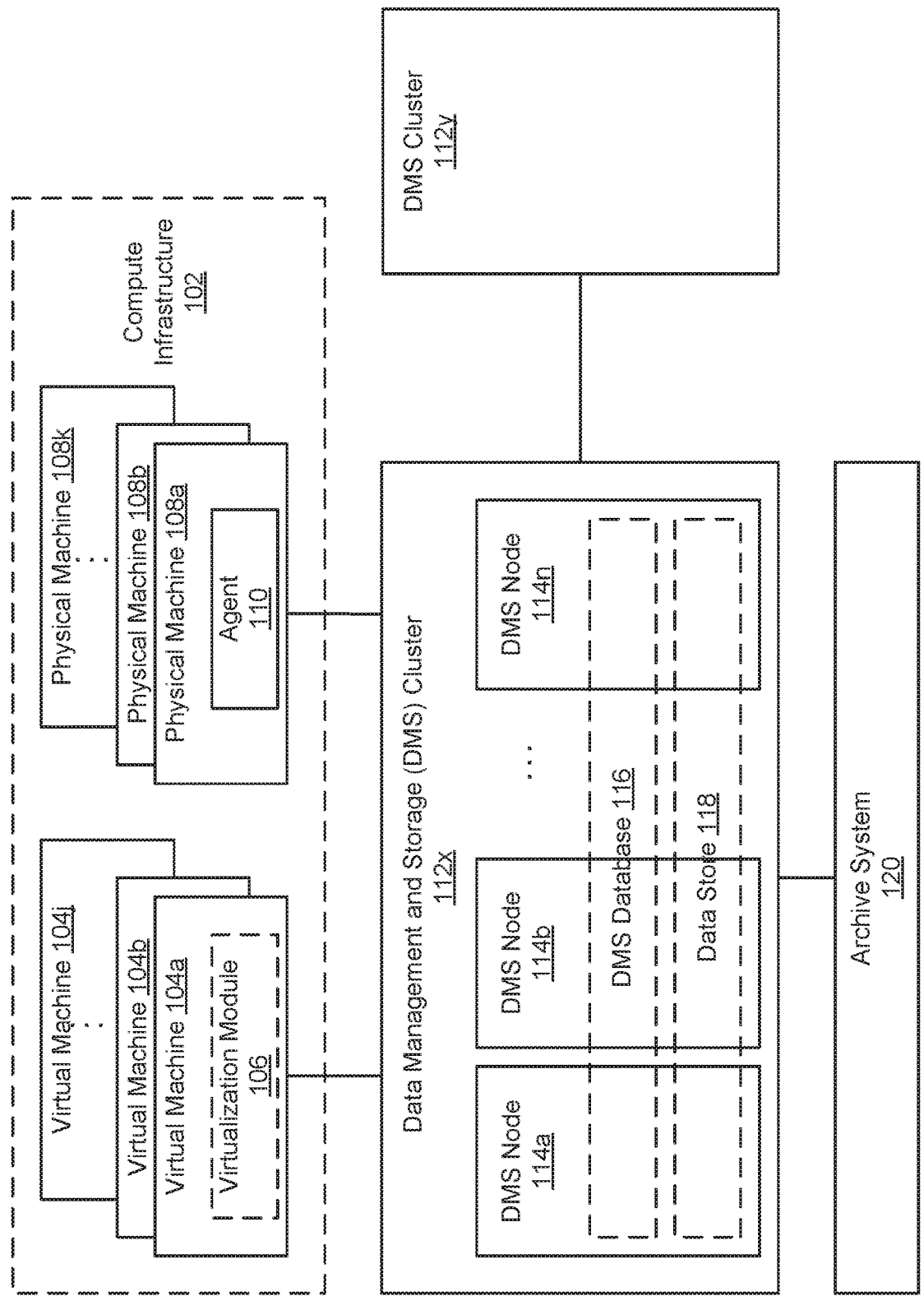
FIG. 1 is a block diagram of a system for managing and storing data, according to one embodiment.

In more detail, FIG. 1 is a block diagram illustrating a system for managing and storing data, according to one embodiment. The system includes a data management and storage (DMS) cluster 112x, a secondary DMS cluster 112y and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure can include production environments, in addition to development or other environments.

In this example, the compute infrastructure 102 includes both virtual machines (VMs) 104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples.

The DMS cluster 112 manages and stores data for the compute infrastructure 102. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112x enables recovery of backup data. Derivative workloads (e.g., testing, development, and analytic workloads) may also use the DMS cluster 112x as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time can be spent to retrieve data stored in archive system 120. In contrast, the DMS clusters 112 provide faster data retrieval, such as for backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114, but interacts with the DMS nodes 114a-n collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2. In the following examples, these are shown as tables but other data structures could also be used. The data store 118 contains the backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2:
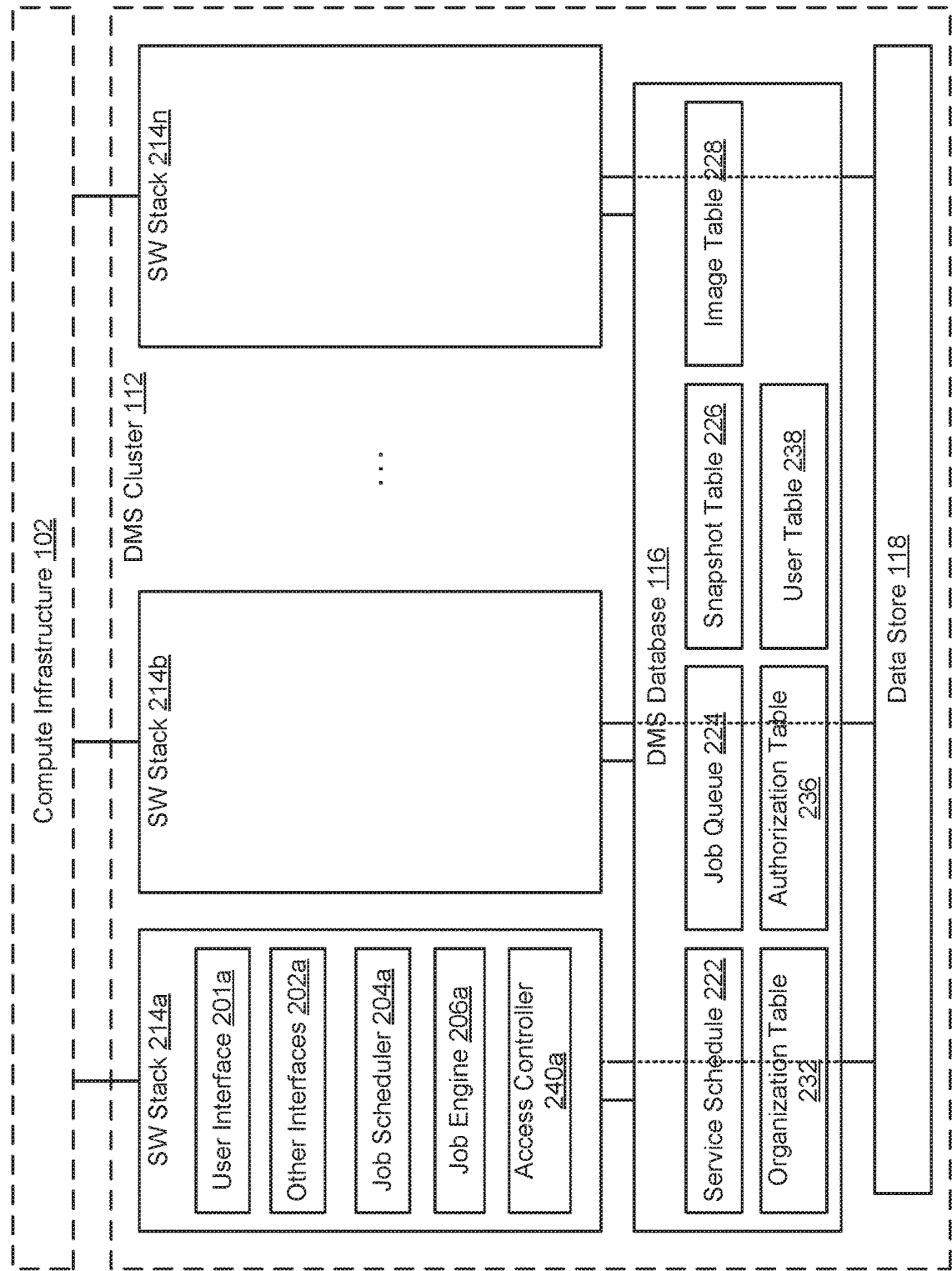
FIG. 2 is a logical block diagram of a data management and storage (DMS) cluster, according to one embodiment.

FIG. 2 is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a, and an access controller 240a. This stack is replicated on each of the software stacks 214b-n for the other DMS nodes. The DMS database 116 includes the following data structures: a service schedule 222, a job queue 224, a snapshot table 226, an image table 228, an organization table 232, an authorization table 236, and a user table 238. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics. The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. In some embodiments, a set of job may be associated with an application, and performed synchronously. For example, snapshots may be generated for the set of machines associated with the application to generate a snapshot of the application. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution. In some embodiments, a job scheduler 204 performs a scheduling function to cause the DMS cluster 112 to perform a synchronized DMS service for multiple machines associated with an application.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc.

In some embodiments, the DMS cluster 112 supports a multiple tenant environment of organizations. The access controller 240a implements an authorization framework for the multi-tenant DMS cluster 112 so that authorized users are allowed to perform actions on particular resources within an organization, but are unable to perform actions on resources of other organizations. The resources (e.g., protectable resources such as virtual machines) in the environment are logically grouped into organizations. The user interface 201 generates a user interface for each user that is scoped to the resources within the organization and to the privileges of the user within the organization. When a user attempts to access a resource or otherwise perform an action on a resource, the access controller 240 may perform an authorization process by referencing the organization table 232 and the authorization table 236 to determine whether the user and the organization are authorized to perform the action on the resource. The organizations of each tenant are identified in the organization table 232, and the authorizations related to the organizations are identified in the authorization table 236.

The organization table 232 is a data structure that stores the organizations of the multi-tenant DMS cluster 112. Each organization belongs to a tenant, and is associated with a set of resources. The resources may include (a) protectable resources such as snapshots of machines, (b) users and groups with access (c) service level agreements (SLAs), (d) replication targets such as remote DMS clusters 112, and (e) archive locations such as the archive system 120. For each organization, the organization table 232 may store an organization name, an organization_id, and a reference to a parent organization (if applicable). Thus, the organization table 232 may define a hierarchal structure of organizations.

The authorization table 236 is a data structure that stores individual authorizations associated with an organization and with users. The authorization table 236 stores authorizations which define privileges of principals (e.g., users, groups, or organizations) on resources. Multiple organizations may share an authorization table 236, or each organization may have an authorization table 236. More details of example implementations regarding the authorization framework and use of the organization table 232 and the authorization table 236 are provided in FIGS. 5, 6, 7, and 8 below. The user table 238 stores users and groups, and their hierarchal relationship. A user may inherit an authorization of a group to which the user belongs, and thus the user table 238 may be referenced to retrieve the hierarchal relationships of users and groups. In some embodiments, the relations between users and groups are defined per resource type such that a user or group may have different group membership for different resources. DMS database 116 also stores metadata information for the data in the data store 118. The metadata information may include file names, file sizes, permissions for files, and various times such as when the file was created or last modified.

FIGS. 3 and 4 illustrate operation of the DMS system shown in FIGS. 1-2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m01. Each row of the snapshot table is a different snapshot and each row of the image table is a different image. The snapshot is whatever is being backed up at that point in time. In the nomenclature of FIG. 3C, m001.ss1 is a snapshot of machine m01 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t plus the incremental difference between the snapshots at times t1 and t2. The full backup of snapshot m001.ss1 is denoted as m001.im1, where ".im" indicates this is an image and "1" indicates this is a full image of the snapshot at time t. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIG. 4A shows the snapshot table and image table after backups have been taken for 3 days using the process described in FIG. 3. However, if the service schedule requires 6-hour backups only for the past 2 days, then the 6-hour backups for the first day October 1 are no longer needed. The snapshot m001.ss1 is still needed because the service schedule requires daily backups, but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

Multi-Tenant Authorization Framework

Figure 5:
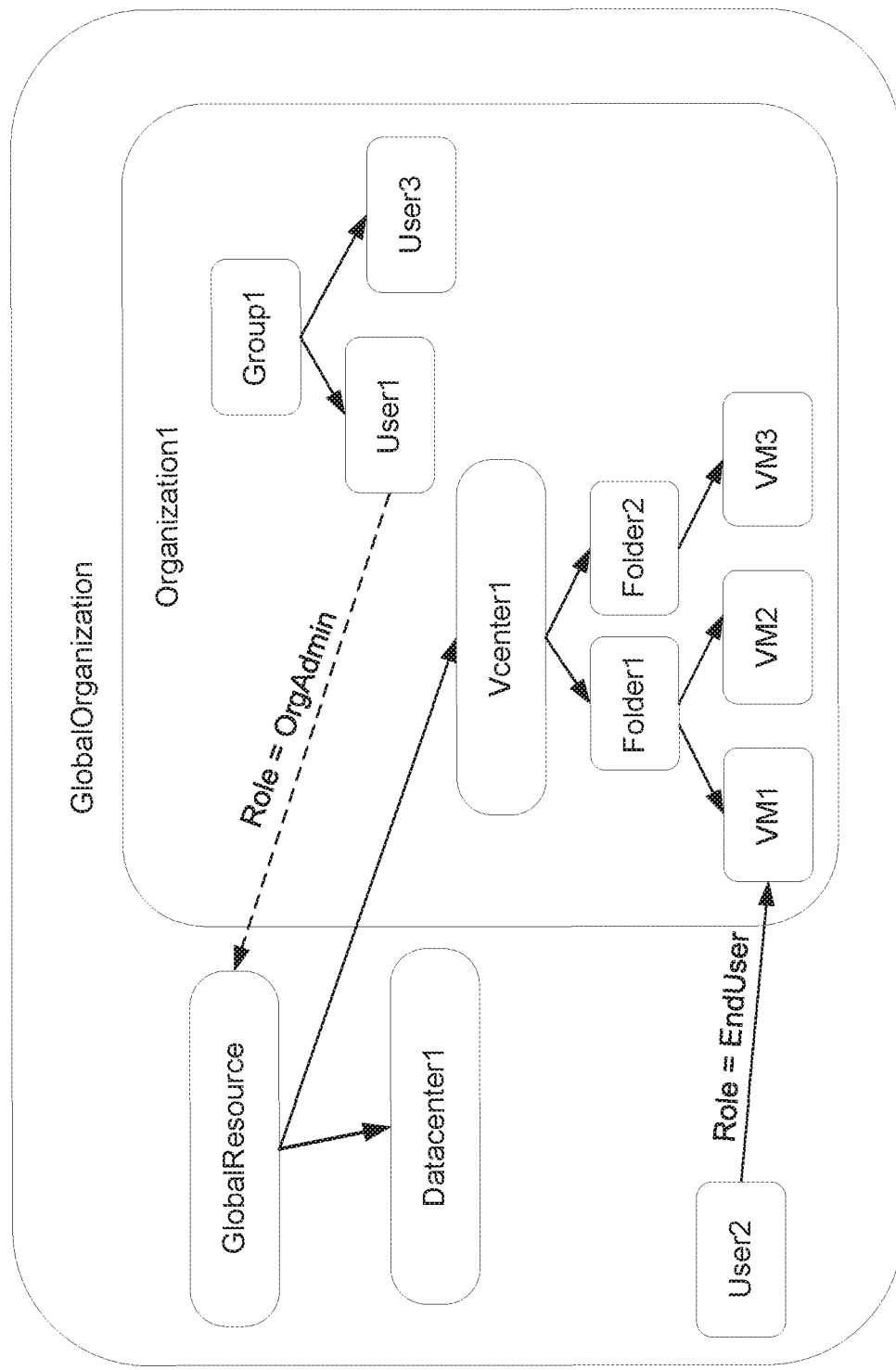
FIG. 5 illustrates resources of an environment of a multi-tenant DMS cluster, according to one embodiment.

FIG. 5 illustrates an environment 500 of a multi-tenant DMS cluster, according to one embodiment. The environment 500 includes protectable resources of the DMS cluster 112 including GlobalResource, Vcenter1, Folder1, Folder2, VM1, VM2, VM3, and Datacenter1. In this example, there is a resource hierarchy with GlobalResource defining a set of data centers of the environment 500 including the Datacenter1 and the Vcenter1. Each data center may include child resources. The Vcenter1 includes Folder1 and Folder2 that store virtual machine snapshots, with Folder1 storing VM1 and VM2, and Folder2 storing VM3. The Vcenter, Folder1, Folder2, VM1, VM2, and VM3 may be examples of protectable resources generated by the DMS cluster 112 performing DMS services. The Datacenter1 is an example of a replication target or archive location. The resource hierarchy defines resource access rules by which a lower level (or child) resource inherits authorizations from a higher level (or parent) resource. Furthermore, the lower level resource may include additional authorizations in addition to those inherited from the parent, and a child resource of the lower level resource may inherit the additional authorizations, and so forth.

The environment 500 further includes a GlobalOrganization and Organization1. An organization refers to a logical grouping of the resources of the environment 500. In some embodiments, different tenants of the multi-tenant DMS cluster 112 are associated with different organizations. Organizations may be organized into an organization hierarchy where lower level organizations belong to higher level organizations. In the environment 500, the GlobalOrganization is a parent of the Organization1. The GlobalOrganization may include multiple child organizations, although only Organization1 is shown for simplicity. Although not shown in FIG. 5, multiple organizations may share a resource.

The environment 500 further includes groups and users, which may be organized in a hierarchy with users belonging to groups. For example, User1 and User3 are children of Group1, and thus inherit the authorizations associated with Group1. The hierarchal relationships between users and groups may be stored in the user table 238. As such, an authorization for a resource applied to Group1 is also applied to User1 and User3. Authorizations may be defined on a per group or per user basis. For example, the User1 has an additional administrator role for the Organization1, and thus has access to the GlobalResource (and child resources). The User3, although belonging to Group1 and thus inheriting authorizations of Group1, may have a different role and no access to the GlobalResource. The User2 belongs to the GlobalOrganization and not Group1 of Organization1, and accesses the VM1 or other resources of Organization1 as an end user. VM1 is also part of GlobalOrganization, and User2 will have access to VM1 in the context of GlobalOrganization, even if User2 does not have access to VM1 in the context of Organization1. The system may request that users sign in to a specific organization, so the user has the context of the organization.

Organizations, groups, and users may all be defined as principals. A principal refers to an object that can be given an authorization on a resource. In the environment 500, the GlobalOrganization, Organization1, Group1, User1, User2, and User3 are examples of principals that may be assigned authorizations. An authorization for an organization to a resource assigns the resource to the organization, such as by assigning a privilege group "ManageResource" for the resource to the organization.

FIG. 6 is an organization table 600 defining organizations of the multi-tenant DMS cluster, according to one embodiment. The organization table 232 defines a hierarchy of organizations. Each row of the organization table 232 defines an organization of the environment 500. Each organization is identified by organization_id, which is the ID number of the organization, and organization_name, which is the name of the organization. Furthermore, each organization has a parent_id that defines the parent organization if the organization has a parent organization. The GlobalOrganization is the highest level organization and thus has a null parent_id. Organization1 is a child of the GlobalOrganization and thus includes the parent_id GlobalOrganization. Organization2 and Organization3 (not shown in FIG. 5) are also organizations in the environment 500. Organization2 is a child of the GlobalOrganization and thus includes the parent_id GlobalOrganization. Organization3 is a child of Organization 1, and thus has the parent_id Organization1.

FIG. 7 is an authorization table 236 defining authorizations to perform actions on resources in an organization, according to one embodiment. The authorizations of the authorization table 236 are defined on a per resource basis. Each row of the authorization table 236 defines an authorization for a principal to perform one or more actions on a resource. In one implementation of inheritance rules, authorizations for a principal are also inherited by all children of the principal, and authorization to perform an action on a resource include the authorization to perform the action on the children of the resource. A "user authorization," as used herein, refers to an authorization that pertains to a user (or a group containing the user) as the principal. A user authorization grants a user permission to perform particular action on a particular resource. An "organization authorization," as used herein, refers to an authorization that pertains to an organization. An organization authorization for a resource assigns the resource to an organization. For each authorization, the authorization table 236 may store (a) a principal_id defining the principal (e.g., organization, user, or group) that has been given the authorization to perform an action on a resource, (b) an organization_id that identifies the organization to which the authorization pertains (c) a role parameter that defines a set of privilege groups, (d) a privilege group parameter that defines a group of privileges, and (e) a resource parameter that defines the resource.

For example, the third row of the authorization table 236 (excluding the title row) specifies an authorization for the User1 pertaining to resources in Organization1, as identified by the organization_id. The row defines the User1 as having an organization administrator (or "OrgAdmin") role with respect to Organization1. An organization administrator refers to a user that has been given administrator level authority on the resources in an organization. The User1 is authorized to perform a set of privileges ("Basic"), as defined by privilege_group, on the resource GlobalResource within Organization1. As such, the User1 (and any children) is also authorized to perform the Basic privileges on children of the Organization1 resource, including Datacenter1, Vcenter1, Folder1, Folder2, VM1, VM2, and VM3. Similarly, the fourth row of the authorization table 236 defines an authorization for the user User2 pertaining to resources in the GlobalOrganization, as identified by the organization_id. The User2 has an end user (or "EndUser") role and thus is authorized to perform a Restore action only on the VM1 resource within the GlobalOrganization. As such, the User2 (and any children) is authorized to perform the Restore action on VM1 (and any children of VM1).

The first row of the authorization table 236 identifies an organization authorization for the Organization1 principal, pertaining to Organization1 as identified by the organization_id. The Organization1 has an Organization role, and is authorized to perform management actions on the Vcenter1 resource based on the ManageResource privilege group parameter assigned to the Organization. Thus, the Organization1 (and child principals, such as users or groups that belong to the Organization1 and assigned to role OrgAdmin) is also authorized to manage the child resources of Vcenter1 including the Folder1, Folder2, VM1, VM2, and VM3. This row identifies the resources Vcenter1 and its children as "belonging" to Organization1. In the second row, another authorization for the Organization1 principal authorizes the Organization1 to perform management actions on the Group 1 resource based on the ManageResource privilege group parameter assigned to the Organization1 for the Group1 resource. The Organization1 (and child principals) are also authorized to manage children of Group1, such as the membership of users or the privileges of Group1.

Figure 8:
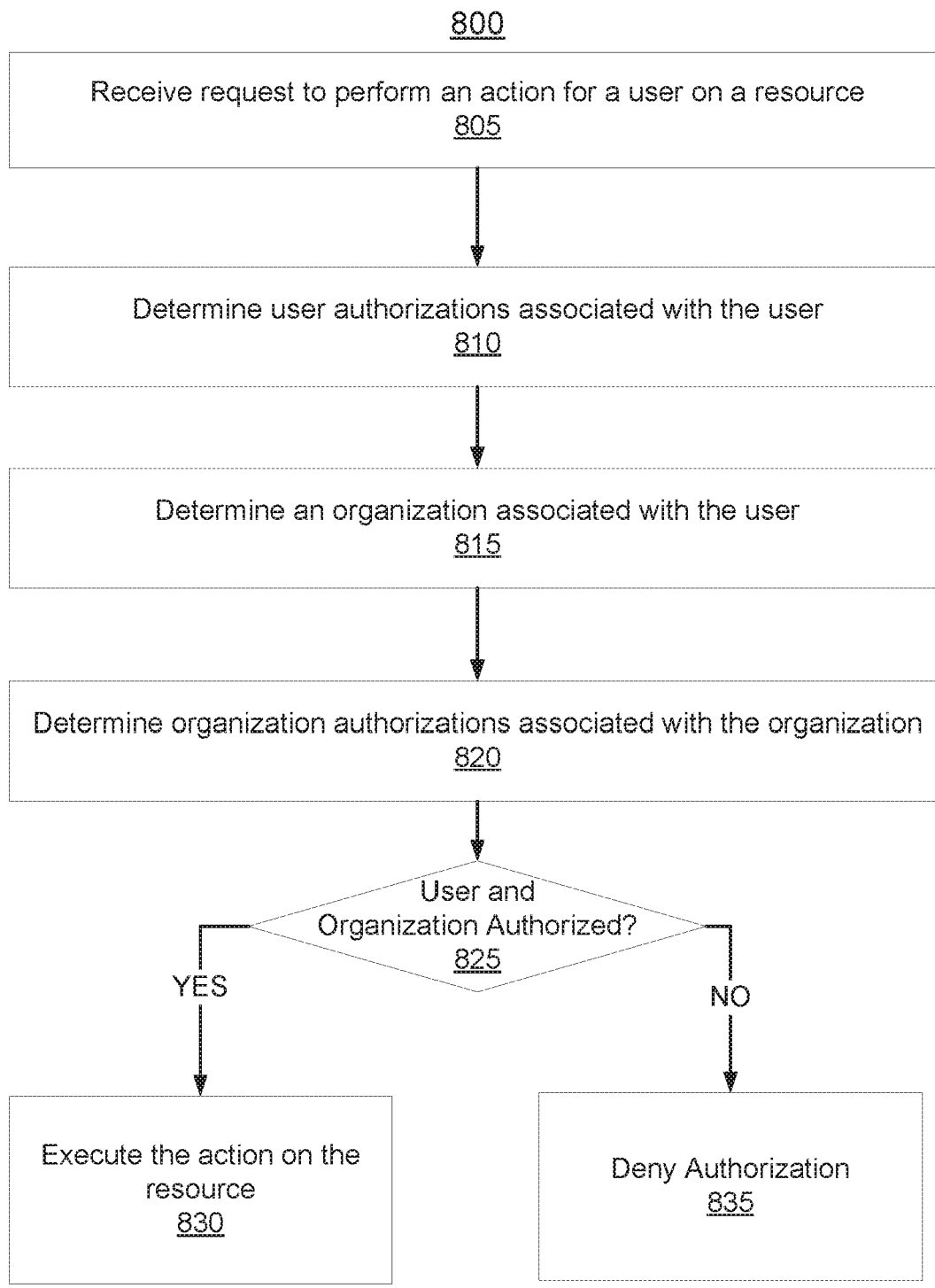
FIG. 8 is a flow chart of a process for authorizing an action on a resource of a multi-tenant DMS cluster, according to one embodiment.

FIG. 8 is a flow chart of a process 800 for authorizing an action on a resource of a multi-tenant DMS cluster, according to one embodiment. The process 800 may include fewer or additional steps, and the steps may be performed in different orders.

A DMS cluster 112 receives 805 a request to perform an action for a user on a resource. The DMS cluster 112 stores and processes data to implement a multi-tenant environment with resources. Sets of resources form organizations, where each tenant may have a different organization. The request to perform an action on the resource may be initiated in various ways, such as depending on the type of action. For example, the user interface 201a of the DMS cluster 112 may generate a user interface to facilitate interaction with the DMS service and creation of the request. The requested action may include viewing the resource, or performing another action associated with the DMS service on the resource such as data backup, replication, etc. for a virtual machine resource. In some embodiments, the DMS cluster 112 (e.g., user interface 201a) supports an application programming interface (API) for generating the request by another application used by the user.

In some embodiments, the request may include an organization_id that identifies the organization, a user_id that identifies the user, and an indication of the requested action and resource. Each user that accesses resources on the DMS cluster 112 may be associated with a user account or otherwise identified. The access controller 240a may request user identification and authentication information to determine the user associated with the request.

The DMS cluster 112 (e.g., access controller 240a) determines 810 user authorizations associated with the user. For example, the access controller 240a may reference the authorization table 236 to determine the authorizations where the principal_id matches the identifier of the user.

Each authorization of the user defines a role (or set of privileges) on a specific resource within a specific organization. The DMS cluster 112 may generate an authorization context for the user that includes all of the user authorizations associated with the user. Although the association between user and authorizations of the user are discussed as being determined by referencing the authorization table 236, other types of data structures may be used.

In some embodiments, the authorizations associated with the user include authorizations associated with one or more groups to which the user belongs. Groups and users may have a hierarchal relationship in terms of authorizations because a user assigned to a group may inherit the authorizations of the group (e.g., as specified in the user table 238). For example, the User1 is a child of Group1, and thus the authorizations of the User1 may also include authorizations of the Group 1. A user may belong to more than one group, and thus may inherit authorizations from multiple groups. As such, the DMS cluster 112 may reference the user table 238 to determine groups of the user, and assign authorizations of the groups to the user.

The DMS cluster 112 (e.g., access controller 240a) determines 815 an organization associated with the user. A user may be defined as a resource of one or more organizations. The access controller 240a may reference the authorization table 236 to determine, for each authorization pertaining to the user, the organization_id of the associated organization. In some embodiments, a user provides identification and authentication information (e.g., login data) to receive access to the organization.

The DMS cluster 112 (e.g., access controller 240a) determines 820 organization authorizations associated with the organization. The DMS cluster 112 has a multi-tenant environment of resources, and thus access to some of the resources in the environment may be limited for the organization. Thus, the organization is also treated as a principal that has authorizations defined with respect to resources of the organization.

In some embodiments, the access controller 240a may reference the authorization table 236 to determine the authorizations where the principal_id matches the organization_id of the organization. Each authorization associated with the organization defines a resource that belongs to the organization and one or more actions that the organization may perform on the resource.

In some embodiments, the authorizations associated with the organization may include authorizations associated with one or more parent organizations of the organization. For example, the access controller 240a may reference the organization table 232 to determine whether the organization has a parent_id that identifies a parent organization, and then reference the authorization table 236 using the parent_id to determine authorizations associated with the parent organization. The DMS cluster 112 may generate an authorization context for the organization that includes all of the organization authorizations associated with the organization and any parent organizations.

The DMS cluster 112 (e.g., access controller 240a) determines 820 whether the user and the organization are authorized to perform the action on the resource based on the user authorizations associated with the user and the organization authorizations associated with the organization. The user authorizations and organization authorizations collectively ensures that only authorized users of an organization can access the resources of the organization. The privileges of the user should include the action on the resource and the privileges of the organization should include access to the resource to authorize the action on the resource. Authorizations may be determined according to resource hierarchy, where authorization for a child resource may be inherited from a parent resource. Furthermore, group hierarchy may indicate that a user is authorized based on inheriting the authorization from a parent group, or organization hierarchy may indicate that an organization is authorized based on inheriting an authorization from a parent organization.

In some embodiments, the authorization context for the user and the authorization context for the organization (and any parent organizations) collectively define each explicit authorization that may be compared with the user, action, and resource of the request. The authorization contexts may be stored in a memory cache to check the privileges of the user and organization. The authorization contexts may be referenced for the action and the resource when the user attempts to perform the action on the resource. The intersection of the authorization contexts of the user and the organization determines whether the action on the resource by the user is authorized. In some embodiments, the authorization context may include authorizations associated with a group that the user belongs, or with an organization that is a parent organization of the organization. Furthermore, authorization for a resource may also indicate that child resources are authorized.

In some embodiments, the DMS cluster 112 (e.g., user interface 201a) uses function such as authorizationContext.isAuthorized(Action, Resource) that is provided as a call to an application programming interface (API) provided by the access controller 240a. The user interface 201 a may generate an authorization context for the user and the organization (and parent organizations), and call the function using the user and organization authorization contexts to receive in response an indication regarding whether the action is permitted for the resource.

In response to determining the user and the organization are authorized to perform the action on the resource, the DMS cluster 112 executes 825 the action on the resource. As discussed above, the action may include access to view the resource. Here, the resource may be provided to the user interface. In some embodiments, the same user interface is generated for different organizations, with the user interface scoped to the resources within a particular organization and to the privileges of a particular user within the organization. Other resources, such as those belonging to other tenant organizations, are thus separated from the resources of the organization. Furthermore, the user interface may include buttons, links, or other interactive elements that are generated based on the authorizations of the user and organization to facilitate execution of authorized actions on resources. In response to determining the user is unauthorized to perform the action, the DMS cluster 112 denies 825 the authorization request or otherwise does not execute the action on the resource.

Figure 9:
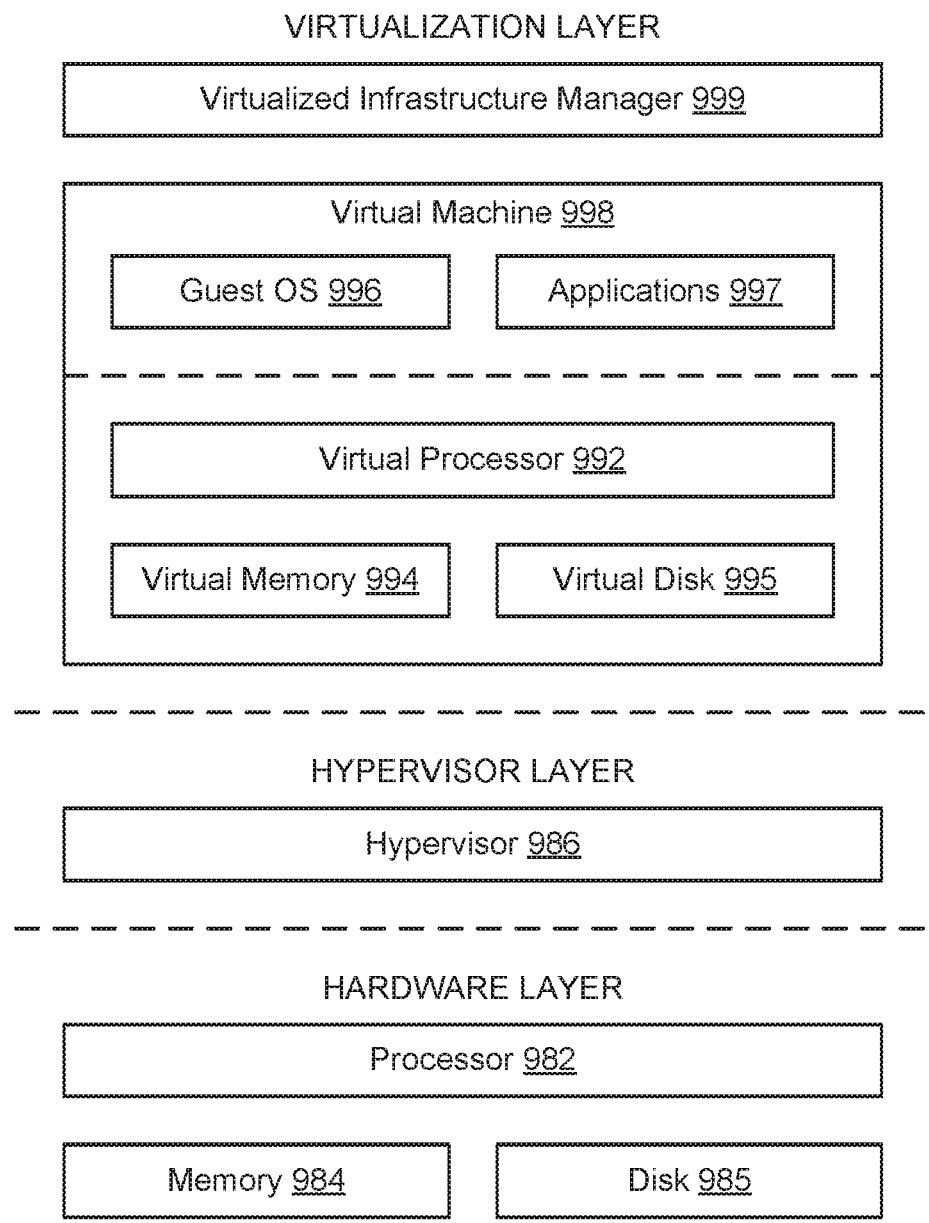
FIG. 9 is a block diagram of a virtual machine, according to one embodiment.

FIG. 9 is a block diagram of a server for a VM platform, according to one embodiment. The server includes hardware-level components and software-level components. The hardware-level components include one or more processors 982, one or more memory 984, and one or more storage devices 985. The software-level components include a hypervisor 986, a virtualized infrastructure manager 999, and one or more virtual machines 998. The hypervisor 986 may be a native hypervisor or a hosted hypervisor. The hypervisor 986 may provide a virtual operating platform for running one or more virtual machines 998. Virtual machine 998 includes a virtual processor 992, a virtual memory 994, and a virtual disk 995. The virtual disk 995 may comprise a file stored within the physical disks 985. In one example, a virtual machine may include multiple virtual disks, with each virtual disk associated with a different file stored on the physical disks 985. Virtual machine 998 may include a guest operating system 996 that runs one or more applications, such as application 997. Different virtual machines may run different operating systems. The virtual machine 998 may load and execute an operating system 996 and applications 997 from the virtual memory 994. The operating system 996 and applications 997 used by the virtual machine 998 may be stored using the virtual disk 995. The virtual machine 998 may be stored as a set of files including (a) a virtual disk file for storing the contents of a virtual disk and (b) a virtual machine configuration file for storing configuration settings for the virtual machine. The configuration settings may include the number of virtual processors 992 (e.g., four virtual CPUs), the size of a virtual memory 994, and the size of a virtual disk 995 (e.g., a 10 GB virtual disk) for the virtual machine 995.

The virtualized infrastructure manager 999 may run on a virtual machine or natively on the server. The virtualized infrastructure manager 999 corresponds to the virtualization module 106 above and may provide a centralized platform for managing a virtualized infrastructure that includes a plurality of virtual machines. The virtualized infrastructure manager 999 may manage the provisioning of virtual machines running within the virtualized infrastructure and provide an interface to computing devices interacting with the virtualized infrastructure. The virtualized infrastructure manager 999 may perform various virtualized infrastructure related tasks, such as cloning virtual machines, creating new virtual machines, monitoring the state of virtual machines, and facilitating backups of virtual machines.

Figure 10:
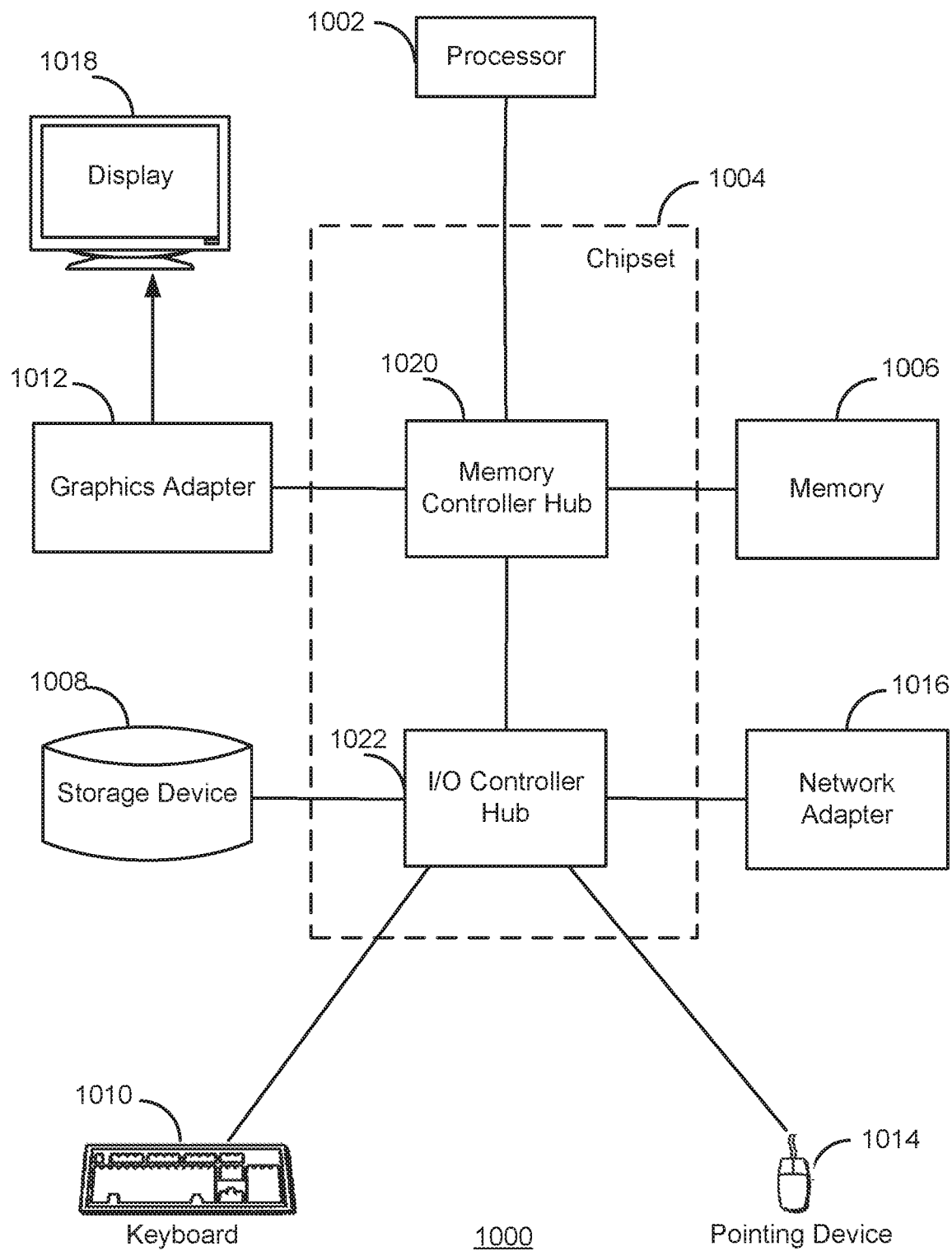
FIG. 10 is a block diagram of a computer system suitable for use in a DMS system, according to one embodiment.

FIG. 10 is a high-level block diagram illustrating an example of a computer system 1000 for use as one or more of the components shown above, according to one embodiment. Illustrated are at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display device 1018 is coupled to the graphics adapter 1012. A storage device 1008, keyboard 1010, pointing device 1014, and network adapter 1016 are coupled to the I/O controller hub 1022. Other embodiments of the computer 1000 have different architectures. For example, the memory 1006 is directly coupled to the processor 1002 in some embodiments.

The storage device 1008 includes one or more non-transitory computer-readable storage media such as a hard drive, compact disk read-only memory (CD-ROM), DVD, or a solid-state memory device. The memory 1006 holds instructions and data used by the processor 1002. The pointing device 1014 is used in combination with the keyboard 1010 to input data into the computer system 1000. The graphics adapter 1012 displays images and other information on the display device 1018. In some embodiments, the display device 1018 includes a touch screen capability for receiving user input and selections. The network adapter 1016 couples the computer system 1000 to a network. Some embodiments of the computer 1000 have different and/or other components than those shown in FIG. 10. For example, the virtual machine 102, the physical machine 104, and/or the DMS node 110 in FIG. 1 can be formed of multiple blade servers and lack a display device, keyboard, and other components.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. In a data management and storage (DMS) cluster, a method for authorizing actions by a user, the method comprising:
   determining user authorizations associated with the user;
   determining an organization associated with the user;
   determining organization authorizations associated with the organization;
   determining whether the user authorizations and the organization authorizations indicate that a first action by the user on a resource is authorized, the user authorizations comprising inherited authorizations from group authorizations based on a hierarchal relationship within the organization;
   responsive to determining that the first action by the user on the resource is authorized, executing the action on the resource, wherein the resource is a virtual machine, and executing the action on the resource includes capturing a first snapshot of the virtual machine;
   storing the first snap shot in a data store associated with a particular DMS node among peer DMS nodes;
   assigning a second action to the particular DMS node, the second action including capturing a second snapshot of the virtual machine, and comparing the first and second snapshots; and
   generating images based on the captured first and second snapshots; and
   storing the images in a data structure in the data store.

2. The method of claim 1, wherein determining whether the user authorizations and the organization authorizations indicate that the action by the user on the resource is authorized includes:
   determining whether the user authorizations and the organization authorizations indicate that the action by the user on a parent resource of the resource is authorized; and
   determining that the action by the user on the resource is authorized responsive to the determination that the action by the user on the parent resource is authorized.

3. The method of claim 1, wherein determining whether the user authorizations and the organization authorizations indicate that the action by the user on the resource is authorized includes determining whether privileges of the user includes the action and the privileges of the organization includes access to the resource.

4. The method of claim 1, wherein determining the organization associated with the user includes referencing an authorization table to identify one or more organizations of the multitenant environment associated with the user.

5. The method of claim 1, wherein determining whether the user authorizations and the organization authorizations indicate that the action by the user on the resource is authorized includes:
   generating a user authorization context including each authorization associated with the user;
   generating an organization authorization context including each authorization associated with the organization; and
   determining whether the action on the resource is authorized based on whether the user authorization context and the organization authorization context authorize the action by the user on the resource.

6. The method of claim 1, wherein executing the action on the resource includes providing the resource to a user interface accessible to the user.

7. The method of claim 1, further comprising:
receiving a request to perform the action for the user on the resource; and
responsive the request, determining whether the user authorizations and the organization authorizations indicate that the action by the user on the resource is authorized.

8. The method of claim 1, wherein:
determining the user authorizations includes referencing an authorization table to generate an authorization context that includes each user authorization associated with the user; and
determining whether the user authorizations and the organization authorizations indicate that the action by the user on the resource is authorized includes referencing the authorization context for the action and for the resource.

9. The method of claim 8, wherein determining the user authorizations includes:
determining a group to which the user belongs, and wherein the generated authorization context includes an authorization associated with the group.

10. The method of claim 1, wherein:
determining the organization authorizations includes referencing an authorization table to generate an authorization context that includes each authorization associated with the organization; and
determining whether the user authorizations and the organization authorizations indicate that the action by the user on the resource is authorized includes referencing the authorization context for the action and for the resource.

11. The method of claim 10, wherein determining the organization authorizations includes:
determining a parent organization of the organization, and wherein the generated authorization context includes an authorization associated with the parent organization.

12. A data management and storage (DMS) cluster, comprising:
peer DMS nodes; and
a distributed data store implemented across the peer DMS nodes;
wherein the peer DMS nodes are configured to collectively implement:
determining user authorizations associated with a user;
determining an organization associated with the user;
determining organization authorizations associated with the organization;
determining whether the user authorizations and the organization authorizations indicate that a first action by the user on the resource is authorized, the user authorizations comprising inherited authorizations from group authorizations based on a hierarchal relationship within the organization;
responsive to determining that the first action by the user on the resource is authorized, executing the action on the resource, wherein the resource is a virtual machine, and executing the action on the resource includes capturing a first snapshot of the virtual machine;
storing the first snap shot in a section of the distributed data store associated with a particular DMS node among the peer DMS nodes;
assigning a second action to the particular DMS node among the peer DMS nodes, the second action including capturing a second snapshot of the virtual machine, and comparing the first and second snapshots; and
generating images based on the captured first and second snapshots; and
storing the images in a data structure in the distributed data store.

13. The DMS cluster of claim 12, wherein determining whether the user authorizations and the organization authorizations indicate that the action by the user on the resource is authorized includes:
determining whether the user authorizations and the organization authorizations indicate that the action by the user on a parent resource of the resource is authorized; and
determining that the action by the user on the resource is authorized responsive to the determination that the action by the user on the parent resource is authorized.

14. The DMS cluster of claim 12, wherein the action on the resource includes at least one of:
capturing a snapshot of a virtual machine; or
providing the resource to a user interface accessible to the user.

15. The DMS cluster of claim 12, wherein:
determining the user authorizations includes referencing an authorization table to generate an authorization context that includes each user authorization associated with the user; and
determining whether the user authorizations and the organization authorizations indicate that the action by the user on the resource is authorized includes referencing the authorization context for the action and for the resource.

16. The DMS cluster of claim 15, wherein determining the user authorizations includes:
determining a group to which the user belongs, and wherein the generated authorization context includes an authorization associated with the group.

17. The DMS cluster of claim 12, wherein:
determining the organization authorizations includes referencing an authorization table to generate an authorization context that includes each authorization associated with the organization; and
determining whether the user authorizations and the organization authorizations indicate that the action by the user on the resource is authorized includes referencing the authorization context for the action and for the resource.

18. The DMS cluster of claim 17, wherein determining the organization authorizations includes:
determining a parent organization of the organization, and wherein the generated authorization context includes an authorization associated with the parent organization.

19. A non-transitory computer-readable medium comprising instructions that when executed by a processor configure the processor to implement a process comprising:
determining user authorizations associated with the user;
determining an organization associated with the user;
determining organization authorizations associated with the organization;
determining whether the user authorizations and the organization authorizations indicate that a first action by the user on a resource is authorized, the user authorizations comprising inherited authorizations from group authorizations based on a hierarchal relationship within the organization;

responsive to determining that the first action by the user on the resource is authorized, executing the action on the resource, wherein the resource is a virtual machine, and executing the action on the resource includes capturing a first snapshot of the virtual machine;

storing the first snap shot in a data store associated with a particular DMS node among peer DMS nodes;

assigning a second action to the particular DMS node, the second action including capturing a second snapshot of the virtual machine, and comparing the first and second snapshots; and generating images based on the captured first and second snapshots; and storing the images in a data structure in the data store.

* * * * *

UNITED STATES PATENT AND TRADEMARK OFFICE
CERTIFICATE OF CORRECTION

| | |
|---|---|
| PATENT NO. | : 11,010,487 B2 |
| APPLICATION NO. | : 16/453274 |
| DATED | : May 18, 2021 |
| INVENTOR(S) | : Noe et al. |

Page 1 of 1

It is certified that error appears in the above-identified patent and that said Letters Patent is hereby corrected as shown below:

In the Specification

In Column 9, Line 4, delete "m01." and insert --m001.-- therefor

In Column 9, Line 9, delete "m01" and insert --m001-- therefor

In Column 9, Line 15, delete "t" and insert --t1-- therefor

In Column 9, Line 20, delete "t." and insert --t1.-- therefor

In Column 11, Line 31, delete "Organization 1," and insert --Organization1,-- therefor In Column 12, Line 19, delete "Organization." and insert --Organization1.-- therefor In Column 12, Lines 27-28, delete "Group 1" and insert --Group1-- therefor In Column 13, Line 17, delete "Group 1." and insert --Group1.-- therefor In Column 14, Line 30, delete "201 a" and insert --201a-- therefor Signed and Sealed this
Seventh Day of September, 2021

Drew Hirshfeld
*Performing the Functions and Duties of the
Under Secretary of Commerce for Intellectual Property and
Director of the United States Patent and Trademark Office*